United States Patent
Pu et al.

(10) Patent No.: US 10,310,691 B2
(45) Date of Patent: Jun. 4, 2019

(54) SELF-CAPACITANCE TOUCH STRUCTURE HAVING TOUCH ELECTRODES WITH SIDE WING PORTIONS AND DISPLAY DEVICE THEREOF

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Xun Pu, Beijing (CN); Zhifu Dong, Beijing (CN); Hongmin Li, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 15/674,413

(22) Filed: Aug. 10, 2017

(65) Prior Publication Data

US 2018/0074615 A1    Mar. 15, 2018

(30) Foreign Application Priority Data

Sep. 9, 2016  (CN) .......................... 2016 1 0816370

(51) Int. Cl.
*G06F 3/044*  (2006.01)
*G06F 3/041*  (2006.01)

(52) U.S. Cl.
CPC ............ *G06F 3/044* (2013.01); *G06F 3/0412* (2013.01)

(58) Field of Classification Search
CPC ....................................... G06F 3/044
USPC ........................................................... 345/174
See application file for complete search history.

(56) References Cited

U.S. PATENT DOCUMENTS

| 2011/0157079 | A1* | 6/2011 | Wu .......................... | G06F 3/044 345/174 |
| 2015/0097801 | A1* | 4/2015 | Trend ...................... | G06F 3/046 345/174 |
| 2016/0253036 | A1* | 9/2016 | Yang ........................ | G09G 3/20 345/174 |
| 2017/0228068 | A1  | 8/2017 | Pu et al. | |

FOREIGN PATENT DOCUMENTS

CN            105094483 A      11/2015

OTHER PUBLICATIONS

First Office Action for Chinese Application No. 201621049057.1, dated Mar. 31, 2017, 2 Pages.

* cited by examiner

*Primary Examiner* — Long D Pham
(74) *Attorney, Agent, or Firm* — Brooks Kushman P.C.

(57) ABSTRACT

The present disclosure provides a self-capacitance touch structure, a touch panel and a display device. The self-capacitance touch structure comprising a plurality of self-capacitance touch electrodes arranged in an array, the self-capacitance touch electrode comprising a main body portion and a side wing portion protruding from at least one side of the main body portion, wherein at least one recess is formed between the side wing portion and the main body portion, the side wing portion of at least one self-capacitance touch electrode in at least one row extends into the recess of a self-capacitance touch electrode, adjacent to the at least one self-capacitance touch electrode, in another row.

18 Claims, 4 Drawing Sheets

SELF-CAPACITANCE TOUCH STRUCTURE HAVING TOUCH ELECTRODES WITH SIDE WING PORTIONS AND DISPLAY DEVICE THEREOF

CROSS-REFERENCE TO RELATED APPLICATIONS

This application claims priority to Chinese Patent Application No. 201610816370.1 filed on Sep. 9, 2016 in the State Intellectual Property Office of the P.R.C, the disclosure of which is incorporated herein by reference in its entirety.

TECHNICAL FIELD

The present disclosure relates to the field of display technology, and in particular, to a self-capacitance touch structure, a touch panel and a display device.

BACKGROUND

With the rapid development of the display technique, touch panels have been widely used in daily lives. Currently, based on their structures, touch panels may be classified into Add on Mode touch panels, on-cell touch panels and in-cell touch panels. For the Add on Mode touch panels, the touch panel and a liquid crystal display (LCD) panel are produced separately, and then attached together so as to form the LCD panel having a touch function. However, there exist for the Add on Mode touch panels such drawbacks as high manufacturing costs, low light transmittance and large module thickness. For the in-cell touch panels, a touch electrode of the touch panel is built in the LCD panel so as to reduce the thickness of the entire module and remarkably reduce the manufacturing costs, so the in-cell touch panels have attracted more and more attention from manufacturers.

The existing in-cell touch panels mainly have a mutual-capacitance structure and a self-capacitance structure.

However, for the self-capacitance touch structure in the related art, since each self-capacitance touch electrode needs a wire to be connected to a flexible circuit board bonder, when there is a large number of self-capacitance touch electrodes, the number of required pins at a bonding pad is increased correspondingly, thereby reducing the width of the pin and the distance between adjacent pins, and in turn increasing the difficulty of bonding process and a failure rate. Therefore, the problem to be solved urgently is how to reduce the number of wirings and that of the electrode pins at the bonding pad without adversely affecting the touch performance.

SUMMARY

An object of the present disclosure is to provide a self-capacitance touch structure, a touch panel and a display device to increase the size of the self-capacitance touch electrode and reduce the number of the self-capacitance touch electrodes under the precondition of ensuring the touch accuracy, thereby reducing the number of wirings and that of corresponding electrode pins at the bonding pad.

The present disclosure provides the technical solutions as follows.

In an aspect, the present disclosure provides a self-capacitance touch structure, which includes a plurality of self-capacitance touch electrodes arranged in an array, each of the self-capacitance touch electrodes including a main body portion and a side wing portion protruding from at least one side of the main body portion. At least one recess is formed between the side wing portion and the main body portion, the side wing portion of at least one self-capacitance touch electrode in at least one row extends into the recess of a self-capacitance touch electrode, adjacent to the at least one self-capacitance touch electrode, in another row.

In a possible embodiment of the present disclosure, the shape of the main body portion at least includes a strip shape including two opposite long sides extending in a first direction; each of the self-capacitance touch electrodes at least includes two side wing portions symmetrically disposed at the two opposite long sides of the main body portion, which are a first side wing portion and a second side wing portion respectively; the self-capacitance touch electrodes in a same row are spaced from each other, the self-capacitance touch electrodes in two adjacent rows are arranged in a staggered manner, the main body portion of at least one self-capacitance touch electrode in at least one row extends into a gap between two adjacent self-capacitance touch electrodes in another row; the first side wing portion of at least one self-capacitance touch electrode in at least one row extends into the recess between the second side wing portion and the main body portion of the self-capacitance touch electrode, adjacent to the at least one self-capacitance touch electrode, in another row; and the second side wing portion of at least one self-capacitance touch electrode in at least one row extends into the recess between the first side wing portion and the main body portion of the self-capacitance touch electrode, adjacent to the at least one self-capacitance touch electrode, in another row.

In a possible embodiment of the present disclosure, at least two recesses are formed between the side wing portion and the main body portion, and the at least two recesses include a first recess and a second recess opposite to the first recess; the first recess of at least one self-capacitance touch electrode in at least one row is provided therein with the side wing portion of another self-capacitance touch electrode positioned at a side of the at least one self-capacitance touch electrode close to the first recess, the second recess of at least one self-capacitance touch electrode in at least one row is provided therein with a side wing portion of another self-capacitance touch electrode positioned at a side of the at least one self-capacitance touch electrode close to the second recess.

In a possible embodiment of the present disclosure, each of the first side wing portion and the second side wing portion at least includes at least one oblique side which is connected onto the long sides of the main body portion and is obliquely disposed with respect to the long sides of the main body portion, in which the recess is formed between the oblique side and the long side of the main body portion.

In a possible embodiment of the present disclosure, each of the first side wing portion and the second side wing portion at least includes two oblique sides which are connected on a same long side of the main body portion and are disposed opposite to each other, in which two recesses are formed between the two oblique sides and the long sides of the main body portion respectively.

In a possible embodiment of the present disclosure, each of the shapes of the first side wing portion and the second side wing portion at least includes a trapezoid including an upper side, a lower side and an oblique side connected between the upper side and the lower side, and the upper side is overlapped with the long side of the main body portion.

In a possible embodiment of the present disclosure, each of the first side wing portion and the second side wing portion is of a shape of an isosceles trapezoid.

In a possible embodiment of the present disclosure, a width of the main body portion in a second direction is in a range of 2.5 mm~4.5 mm, and the second direction is perpendicular to the first direction; a length of the upper side of the trapezoid in the first direction is in a range of 3 mm~5 mm; a length of the lower side of the trapezoid in the first direction is in a range of 16 mm~22 mm; and the distance between the upper side and the lower side of the trapezoid in the second direction is in a range of 8 mm~11 mm.

In a possible embodiment of the present disclosure, the self-capacitance touch electrode further includes a touch detection chip connected with the plurality of self-capacitance touch electrodes, and the touch detection chip is configured to determine a touch position by detecting a change in a capacitance value of each self-capacitance touch electrode.

In a possible embodiment of the present disclosure, each of the plurality of self-capacitance touch electrodes is connected with the touch detection chip by at least one wire, and the self-capacitance touch electrode and the wire are disposed in different layers.

In another aspect, the present disclosure provides a touch panel, which includes the above self-capacitance touch structure.

In a possible embodiment of the present disclosure, the touch panel includes a first substrate and a second substrate disposed opposite to the first substrate, the self-capacitance touch structure is disposed on the second substrate, and a common electrode layer is disposed on the second substrate, and the plurality of self-capacitance touch electrodes is disposed in a same layer as the common electrode layer.

In yet another aspect, the present disclosure provides a display device, including the above touch panel.

The present disclosure has the following beneficial effects: in the self-capacitance touch structure according to the present disclosure, by providing the main body portion and the side wing portion in any self-capacitance touch electrode, forming the recess between the main body portion and the side wing portion, and extending the side wing portion of adjacent self-capacitance touch electrodes into the recess, compared with the square self-capacitance touch electrode in the related art, each self-capacitance touch electrode and a planar shape of at least another self-capacitance touch electrode positioned at its periphery may be arranged in a staggered manner. Therefore, when a certain self-capacitance touch electrode is touched, at least another self-capacitance touch electrode arranged in a staggered manner with the planar shape of the self-capacitance touch electrode may also be affected due to the touch, thereby determining the touch position by means of the self-capacitance touch electrode and the self-capacitance touch electrode at its periphery. That is, compared with the square self-capacitance touch electrode in the related art, the number of affected electrodes in a same touch area may be increased, thereby correspondingly increasing the area of the self-capacitance touch electrode without adversely affecting the touch performance. Accordingly, the number of the self-capacitance touch electrodes on the touch panel and the number of wirings and that of the electrode pins at the bonding pad may be reduced.

DETAILED DESCRIPTION

The technical solutions in the embodiments of the present disclosure will be clearly and completely described hereinafter with reference to the accompanying drawings. Apparently, these embodiments described herein are merely parts of the embodiments of the present disclosure rather than all the embodiments. Based on the embodiments of the present disclosure, any other embodiments obtained by a person skilled in the art without any creative effort shall fall within the protection scope of the present disclosure.

For the self-capacitance touch structure in the related art, numerous self-capacitance touch electrodes lead to the technical problem of the great number of wirings and many electrode pins at the bonding pad. The present disclosure provides a self-capacitance touch structure to enlarge the size of the self-capacitance touch electrode and reduce the number of the self-capacitance touch electrodes under the precondition of ensuring the touch accuracy, thereby reducing the number of wirings and that of corresponding electrode pins at the bonding pad.

Figure 1:
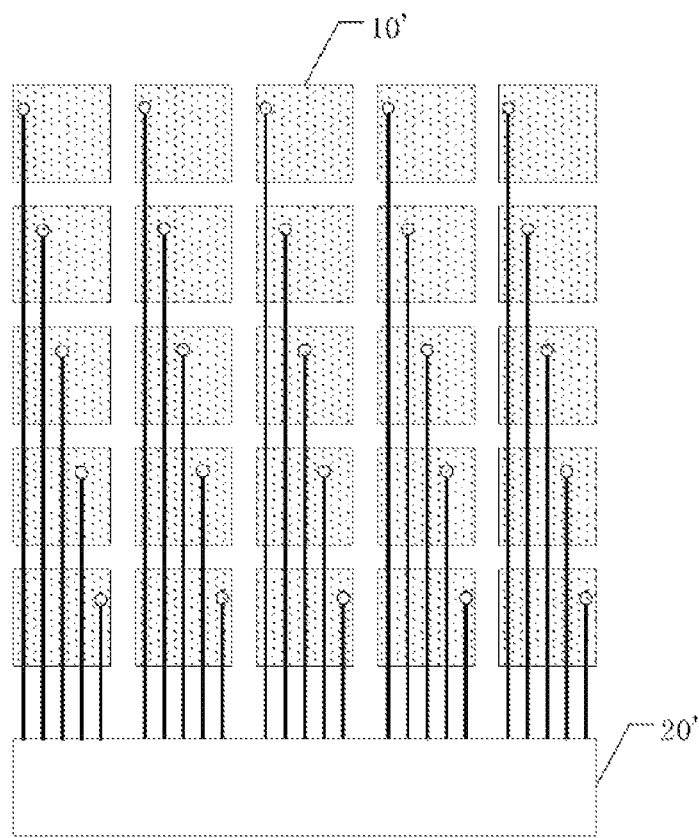
FIG. 1 is a schematic diagram of a self-capacitance touch structure in the related art.
Figure 2:
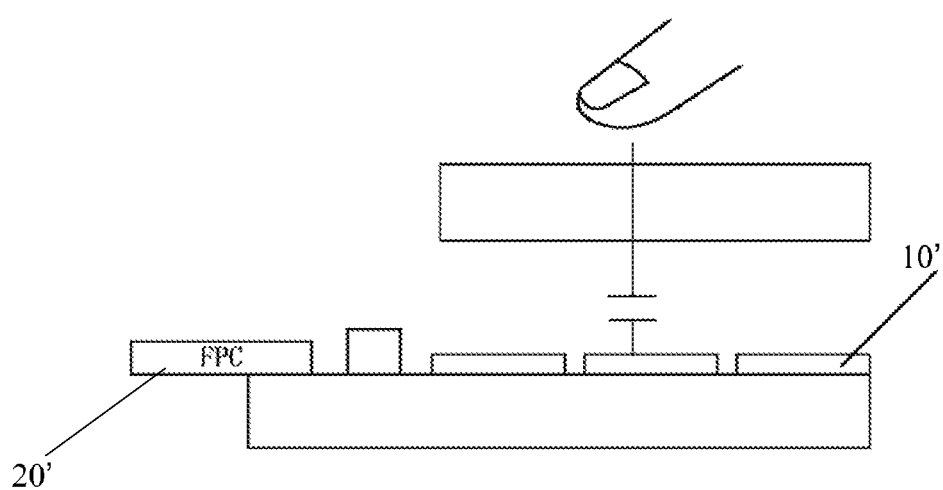
FIG. 2 is a schematic diagram showing the operating principle of the self-capacitance touch structure.

FIG. 1 is a schematic diagram of a self-capacitance touch structure in the related art, including plural self-capacitance touch electrodes 10' which are disposed in the same layer and are insulated from one another. Each self-capacitance touch electrode 10' has a square shape with a size of 5 mm*5 mm, and is connected to a flexible printed circuit board (FPC) bonder 20' by means of a wire. That is, each self-capacitance touch electrode 10' corresponds to one pin at the bonding pad. When the touch panel operates, as shown in FIG. 2, the touch by a human finger causes a change in the capacitance of the corresponding square self-capacitance touch electrode 10', and thus the position touched by the finger may be determined based on the capacitance change.

Figure 3:
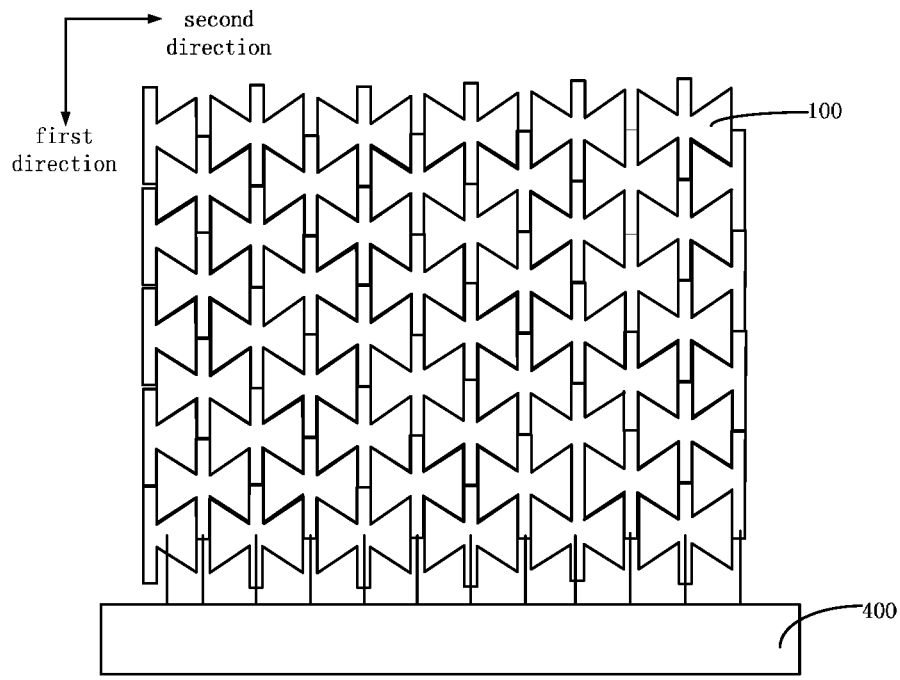
FIG. 3 is a schematic diagram of the self-capacitance touch structure according to the embodiments of the present disclosure.
Figure 4:
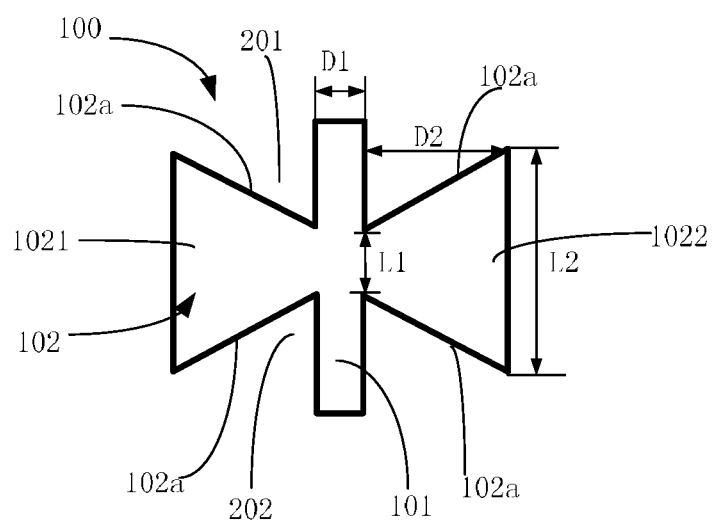
FIG. 4 is a schematic diagram of the self-capacitance touch electrode according to the embodiments of the present disclosure.

As shown in FIGS. 3 and 4, the embodiments of the present disclosure provide a self-capacitance touch structure, including a plurality of self-capacitance touch electrodes 100 arranged in an array, each of the self-capacitance touch electrodes 100 including a main body portion 101 and a side wing portion 102 protruding from at least one side of the main body portion 101. At least one recess is formed between the side wing portion 102 and the main body portion 101, and the side wing portion 102 of the self-capacitance touch electrode 100 in each row extends into the recess of a self-capacitance touch electrode, adjacent to the self-capacitance touch electrode, in another row.

In the self-capacitance touch structure according to the present disclosure, by providing the main body portion 101 and the side wing portion 102 in any self-capacitance touch electrode 100, and forming the recess between the main body portion 101 and the side wing portion 102, and extending the side wing portion 102 of the adjacent self-capacitance touch electrodes 100 into the recess of the self-capacitance touch electrode, each self-capacitance touch electrode 100 and a planar shape of at least another self-capacitance touch electrode 100 positioned at its periphery may be arranged in a staggered manner. Therefore, when a certain self-capacitance touch electrode 100 is touched, at least another self-capacitance touch electrode 100 arranged in a staggered manner with the planar shape of the self-capacitance touch electrode 100 may also be affected due to the touch, thereby determining the touch position by means of the self-capacitance touch electrode 100 and the self-capacitance touch electrode 100 at its periphery. That is, compared with the square self-capacitance touch electrode in the related art, the number of the affected self-capacitance touch electrodes 100 in a same touch area may be increased, thereby correspondingly increasing the area of the self-capacitance touch electrode 100 without adversely affecting the touch performance. Accordingly, the number of the self-capacitance touch electrodes 100 on the touch panel and the number of wirings and that of the electrode pins at the bonding pad may be reduced.

The optional embodiments of the self-capacitance touch structure according to the embodiment of the present disclosure will be described herein.

In the present embodiment, alternatively, as shown in FIGS. 3 and 4, the shape of the main body portion 101 at least includes a strip shape including two opposite long sides extending in a first direction, and the self-capacitance touch electrode 100 at least includes two side wing portions 102 symmetrically disposed at the two opposite long sides of the main body portion 101. Specifically, the two side wing portions 102 are a first side wing portion 1021 and a second side wing portion 1022.

The self-capacitance touch electrodes 100 in the same row are spaced from each other, the self-capacitance touch electrodes 100 in two adjacent rows are arranged in a staggered manner, and the main body portion 10 of each self-capacitance touch electrode 100 extends into a gap between two adjacent self-capacitance touch electrodes 100, adjacent to the self-capacitance touch electrode, in another two rows of self-capacitance touch electrodes 100.

The first side wing portion 1021 of each self-capacitance touch electrode 100 extends into the recess between the second side wing portion 1022 and the main body portion 101 of the self-capacitance touch electrode 100, adjacent to the self-capacitance touch electrode, in another row.

The second side wing portion 1022 of each self-capacitance touch electrode extends into the recess between the first side wing portion 1021 and the main body portion 101 of the self-capacitance touch electrode 100, adjacent to the self-capacitance touch electrode, in another row.

In the above solution, the main body portion 101 has a strip shape and is inserted into a gap between two self-capacitance touch electrodes which are spaced from each other. When the touch area is located at the gap between the two self-capacitance touch electrodes which are spaced from each other, three self-capacitance touch electrodes may be affected at least. In addition, two side wing portions 102 are disposed symmetrically on two opposite long sides of the strip-shaped main body portion 101 respectively, the recesses are formed between the two side wing portions 102 and the main body portion 101 respectively, and the recesses formed between the two side wing portions 102 and the main body portion 101 of each self-capacitance touch electrode 100 are provided therein with the side wing portion 102 of at least another two self-capacitance touch electrodes 100 adjacent thereto. That is, each self-capacitance touch electrode 100 and the planar shape of at least another two self-capacitance touch electrodes 100 positioned at its periphery are arranged in a staggered manner. Therefore, when a certain self-capacitance touch electrode 100 is touched, at least another two self-capacitance touch electrodes 100 arranged in a staggered manner with the planar shape of the self-capacitance touch electrode 100 may also be affected due to the touch, thereby determining the touch position by means of the self-capacitance touch electrode 100 and the self-capacitance touch electrode 100 at its periphery, which facilitate guaranteeing the touch accuracy.

It is should be noted that in the above technical solution, as shown in FIGS. 3 and 4, optionally, the main body portion of the self-capacitance touch electrode is rectangular and may have other shapes in practical applications, which is not limited herein.

Optionally, as shown in FIG. 4, at least two recesses are formed between each of the side wing portions 102 and each of the main body portions 101, and include a first recess 201 and a second recess 202 opposite to the first recess 201, the first recess 201 of each self-capacitance touch electrode 100 is provided therein with a side wing portion of another self-capacitance touch electrode positioned at a side of the self-capacitance touch electrode close to the first recess 201, the second recess 202 of each self-capacitance touch electrode 100 is provided therein with a side wing portion of another self-capacitance touch electrode positioned at a side of the self-capacitance touch electrode close to the second recess 202.

According to the above solution, at least the first recess 201 and the second recess 202 are formed between each side wing portion 102 and the main body portion 101. As such, some self-capacitance touch electrode 100 and the planar shape of another four self-capacitance touch electrodes 100 positioned at its periphery may be arranged in a staggered manner. Therefore, when a certain self-capacitance touch electrode 100 is touched, at least another four self-capacitance touch electrodes 100 arranged in a staggered manner with the planar shape of the self-capacitance touch electrode 100 may also be affected due to the touch, thereby determining the touch position by means of the self-capacitance touch electrode 100 and the self-capacitance touch electrode 100 at its periphery, which further facilitate guaranteeing the touch accuracy.

In addition, in the present embodiment, optionally, as shown in FIG. 4, each side wing portion 102 at least includes at least one oblique side 102*a* which is connected onto the long sides of the main body portion 101 and is obliquely disposed with respect to the long sides of the main body portion 101. The recess is formed between the oblique side 102*a* and the long side of the main body portion 101.

According to the above solution, a recess having an oblique side may be formed between the oblique side 102*a* of the side wing portion 102 and the main body portion 101. That is, the recess is oblique with a gradually changing inner width. Correspondingly, the shape of the side wing portion 102 of another self-capacitance touch electrode 100 extending into the recess matches the shape of the recess. Thus, compared with a straight recess with a constant inner width, when the user touches the area where the recess of the self-capacitance touch electrode 100 is located, due to the gradual change in the inner width of the recess, even if the touch area is small, two self-capacitance touch electrodes 100 may be affected at least; if the recess of the self-capacitance touch electrode 100 has the constant inner width, only one self-capacitance touch electrode 100 may be affected. As such, by adopting the above solution, the touch accuracy may be guaranteed.

In the embodiment according to the present disclosure, as shown in FIG. 4, optionally, each of the side wing portions 102 at least includes two oblique sides 102a which are connected on the same long side of the main body portion 101 and are disposed opposite to each other, in which two recesses are formed between the two oblique sides 102a and the long sides of the main body portion 101 respectively.

According to the above solution, an upper oblique recess and a lower oblique recess may be formed between each of the side wing portions 102 and the main body portion 101. It should be understood that in practical applications, the structure of the side wing portion 102 is not limited thereto.

In addition, in the optional embodiment according to the present disclosure, as shown in FIG. 4, the shape of the side wing portion 102 at least include a trapezoid including an upper side, a lower side and oblique sides 102a connected between the upper side and the lower side. The upper side is overlapped with the long side of the main body portion 101.

According to the above solution, the self-capacitance touch electrode 100 has a butterfly-shaped structure. In manufacturing the self-capacitance touch structure, there is no need to change the original manufacturing process of the self-capacitance touch structure. That is, the original manufacturing process may be used, but the shape of each self-capacitance touch electrode 100 is changed. That is, the ITO segmentation is cut into the butterfly shape instead of the original square shape, and each self-capacitance touch electrode 100 is led out to the FPC bonding pad by means of the metal wire of the SD layer (source-drain layer).

In addition, it should be noted that in other embodiments according to the present disclosure, the side wing portion 102 is not limited to the trapezoid shape, but may have other shapes. For example, the shape of the side wing portion 102 may also be a triangle or a polygon or a profiled shape with two oblique sides 102a.

In addition, referring to FIG. 4, FIG. 4 is a schematic structure diagram of the self-capacitance touch electrode 100 of a butterfly-shaped structure according to the embodiments of the present disclosure. The side wing portion 102 of the self-capacitance touch electrode 100 is of a shape of an isosceles trapezoid. The width D1 of the main body portion 101 in a second direction is 2.5 mm~4.5 mm, and the second direction is perpendicular to the first direction; the length L1 of the upper side of the trapezoid in the first direction is 3 mm~5 mm; the length L2 of the lower side of the trapezoid in the first direction is 16 mm~22 mm; the distance D2 between the upper side and the lower side of the trapezoid in the second direction is 8 mm~11 mm. It should be understood that the specific size of the self-capacitance touch electrode 100 may be determined according to the requirements of different products. Optional solutions are proposed herein, but the present disclosure is not intended to be limited thereto.

For example, in the self-capacitance touch electrode 100 with a butterfly-shaped structure as shown in FIG. 4, the width D1 of the main body portion 101 in the second direction is 3 mm; the length L1 of the upper side of the trapezoid in the first direction is 4.5 mm; the length L2 of the lower side of the trapezoid in the first direction is 19 mm; the distance D2 between the upper side and the lower side of the trapezoid in the second direction is 10 mm.

For a touch display panel with a 192 mm*184 mm active display area (AA area), if a square self-capacitance touch electrode 10' with a size of 7 mm*7 mm is used, 552 self-capacitance touch electrodes 10' are required. That is, the bonding pad needs at least 552 pins. When the self-capacitance touch electrode 100 with this size is adopted, only about 160 self-capacitance touch electrodes 100 are needed. That is, the bonding pad only needs 160 pins, which is 40% of the number of the pins in the related art. Namely, the number of pins is reduced by 60%, which remarkably reduces the number of pins at the bonding pad, while saving plenty of space, reducing the costs of FPC, increasing the bonding pass rate and the product size, and reducing costs.

Additionally, the operating principle of the touch panel with such self-capacitance touch structure is as follows. Each signal wire charges the self-capacitance touch electrode 100 which is a capacitor, and it takes some time to charge the capacitor. However, the required charging time is substantially the same for the same type of capacitor. When a touch is applied, the capacitance of the self-capacitance touch electrode 100 increases (the self-capacitance increases), the time required to fully charge is extended, IC determines whether the touch is applied by determining the charging time, and determines the specific position coordinates based on the change in the peripheral capacitance.

A copper column with a diameter of 7 mm may be adopted to test the touch performance of the self-capacitance touch structure according to the embodiment of the present disclosure and that of the square self-capacitance touch electrode 100 in the related art.

Figure 5:
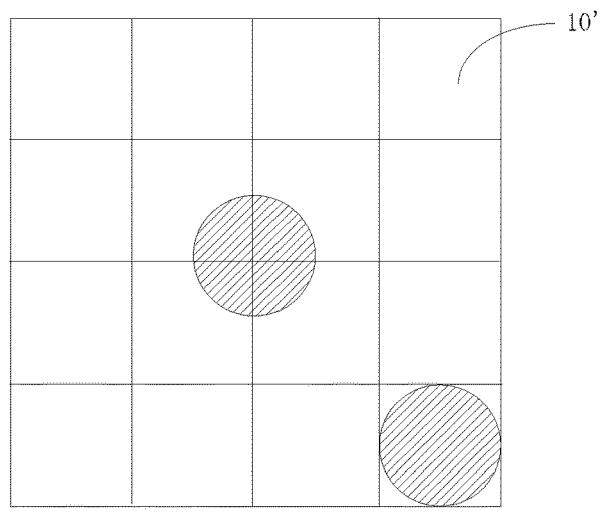
FIG. 5 is a schematic diagram showing a touch performance test of the self-capacitance touch structure in FIG. 1.
Figure 6:
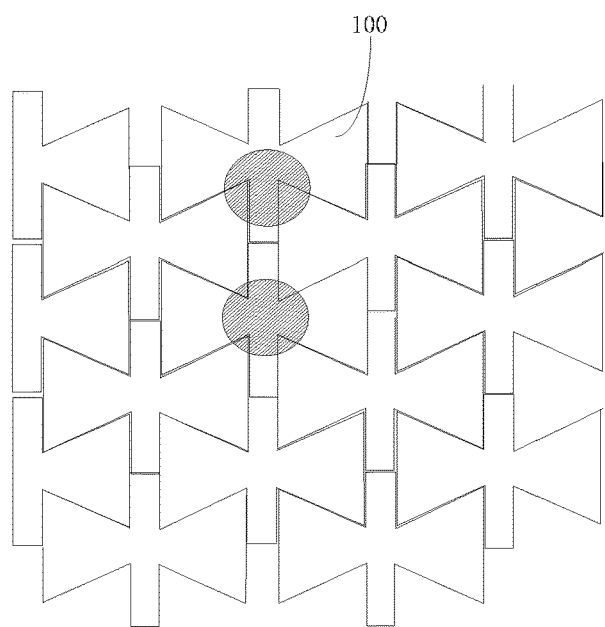
FIG. 6 is a schematic diagram showing the touch performance test of the self-capacitance touch structure in FIG. 3.

For example, when the copper column with a diameter of 7 mm is adopted to test both of the above touch structures, as shown in FIG. 6, at worst, the self-capacitance touch structure according to the embodiment of the present disclosure at least may cause changes in the capacitances of three self-capacitance touch electrodes 100, and at best, cause changes in the capacitances of five self-capacitance touch electrodes 100 at most. For the self-capacitance touch structure in the related art in FIG. 5, as shown in FIG. 5, at worst, the change in the capacitance of only one self-capacitance touch electrode 100 is caused at least, even at best, changes in the capacitances of only four self-capacitance touch electrodes 100 are caused. Therefore, in terms of the touch performance, the self-capacitance touch structure according to the embodiment of the present disclosure is not inferior to that in the related art, but has an improved touch performance.

In addition, in order to reduce the size of an invalid touch area, it is possible to additionally provide a row of self-capacitance touch electrodes 100 with other shapes at the leftmost and rightmost sides of the structure as shown in FIG. 3. For example, the self-capacitance touch electrode 100 with the shape of a half butterfly may be additionally disposed for the purpose of connection. That is, the self-capacitance touch electrode 100 in FIG. 4 only includes parts of the main body portion 101 and the first side wing portion 1021, or only includes parts of the main body portion 101 and the second side wing portion 1022, thereby obtaining the self-capacitance touch structure as shown in FIG. 3.

In addition, in the embodiment of the present disclosure, optionally, as shown in FIG. 3, the self-capacitance touch structure further includes a touch detection chip 400 connected with each of the plurality of self-capacitance touch electrodes 100, for determining a touch position by detecting a change in a capacitance value of each self-capacitance touch electrode 100.

Specifically, the above plurality of self-capacitance touch electrodes 100 may be connected with the touch detection chip 400 by means of a plurality of wires. That is, each self-capacitance touch electrode 100 is connected with the touch detection chip 400 by one wire through which the connected self-capacitance touch electrode 100 is charged. Since the self-capacitance touch electrodes 100 have the substantially same shapes and sizes, the time required to fully charge the capacitor formed by each self-capacitance touch electrode 100 is substantially the same. When a self-capacitance touch electrode 100 is touched, the capacitance formed by the self-capacitance touch electrode 100 would increase (the self-capacitance would increase), the time required to fully charge the capacitance is extended, thereby determining whether a touch is applied by determining the charging time, and determining the specific position coordinates based on the change in the peripheral capacitance.

Optionally, in order to reduce a touch blind area, each of the self-capacitance touch electrodes 100 is connected with the touch detection chip 400 by at least one wire, and the self-capacitance touch electrode 100 and the wire are disposed in different layers.

In addition, the embodiments of the present disclosure further provide a touch panel, including the above self-capacitance touch structure.

The in-cell touch panel according to the embodiment of the present disclosure is not only adapted for a twisted nematic (TN) liquid crystal display screen, but also for an advanced super dimension switch (ADS) liquid crystal display screen and an in-plane switching (IPS) liquid crystal display screen.

Figure 7:
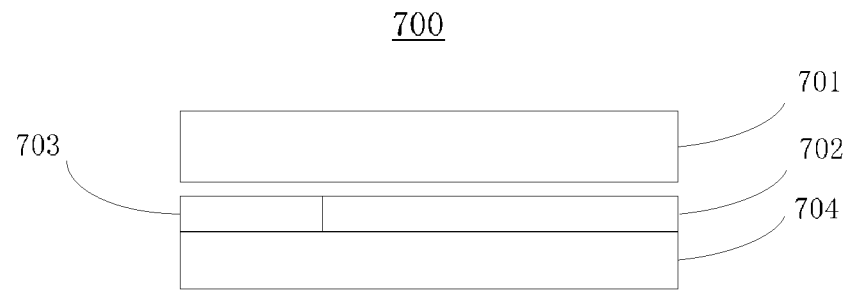
FIG. 7 is a schematic diagram of the touch panel according to the embodiments of the present disclosure.

Optionally, the touch panel includes a first substrate and a second substrate disposed opposite to the first substrate, the self-capacitance touch structure is disposed on the second substrate which is provided thereon with a common electrode layer, and the plurality of self-capacitance touch electrodes 100 is disposed in the same layer as the common electrode layer. The second substrate may be an array substrate. That is, in order to simplify the manufacturing process and reduce the manufacturing costs, the common electrode layer located on the array substrate may be reused as the self-capacitance touch electrode 100. For example, as shown in FIG. 7, the touch panel 700 may include the first substrate 701 and the second substrate 704, and the self-capacitance touch structure 702 and the common electrode layer 703 may be disposed on the second substrate 704 in the same layer. A person skilled in the art shall understand that the relative dimension and relative position of each element shown in FIG. 7 are only schematic and are not limited in the present disclosure.

Figure 8:
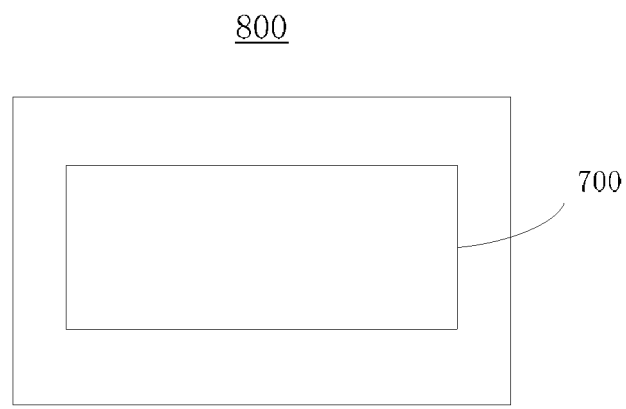
FIG. 8 is a schematic diagram of the display device according to the embodiments of the present disclosure.

The embodiment of the present disclosure further provides a display device including the above touch panel. As shown in FIG. 8, the display device 800 may include the above touch panel 700. The display device according to the embodiment of the present disclosure may be any product or part with a display function such as a laptop display panel, a display, a TV, a digital photo frame, a mobile phone, and a tablet PC.

The above embodiments are only intended to describe the present disclosure, but not to limit the disclosure. Various modifications and variations may be made by those skilled in the art without deviating from the spirit and scope of the present disclosure. All the equivalent technical solutions fall within the scope of the disclosure, and the scope of protection of the disclosure is defined by the claims.

What is claimed is:

1. A self-capacitance touch structure, comprising a plurality of self-capacitance touch electrodes arranged in an array, each self-capacitance touch electrode comprising a main body portion having a strip shape comprising two opposite long sides extending in a first direction, and a first side wing portion and a second side wing portion symmetrically disposed at the two opposite long sides of the main body portion, wherein for each self-capacitance touch electrode, a recess is formed between each side wing portion and the main body portion;

the self-capacitance touch electrodes in a same row are spaced from each other, the self-capacitance touch electrodes in two adjacent rows are arranged in a staggered manner, the main body portion of at least one self-capacitance touch electrode in at least one row extends into a gap between two adjacent self-capacitance touch electrodes in another row;

the first side wing portion of at least one self-capacitance touch electrode in at least one row extends into the recess between the second side wing portion and the main body portion of the self-capacitance touch electrode, adjacent to the at least one self-capacitance touch electrode, in another row; and the second side wing portion of at least one self-capacitance touch electrode in at least one row extends into the recess between the first side wing portion and the main body portion of the self-capacitance touch electrode, adjacent to the at least one self-capacitance touch electrode, in another row.

2. The self-capacitance touch structure according to claim 1, wherein for each self-capacitance touch electrode, at least two recesses are formed between each side wing portion and the main body portion, and the at least two recesses comprise a first recess and a second recess opposite to the first recess;

the first recess of at least one self-capacitance touch electrode in at least one row is provided therein with a respective side wing portion of another self-capacitance touch electrode positioned at a side of the at least one self-capacitance touch electrode close to the first recess, the second recess of at least one self-capacitance touch electrode in at least one row is provided therein with a respective side wing portion of another self-capacitance touch electrode positioned at a side of the at least one self-capacitance touch electrode close to the second recess.

3. The self-capacitance touch structure according to claim 1, wherein, for each self-capacitance touch electrode, each of the first side wing portion and the second side wing portion comprises an oblique side which is connected onto a respective one of the long sides of the main body portion and is obliquely disposed with respect to the respective long side of the main body portion, wherein the recess between the first side wing portion and the main body is formed between the oblique side of the first side wing portion and one of the long sides of the main body portion, and wherein the recess between the second side wing portion and the main body is formed between the oblique side of the second side wing portion and the other long side of the main body portion.

4. The self-capacitance touch structure according to claim 1, wherein, for each self-capacitance touch electrode, each of the first side wing portion and the second side wing portion comprises two oblique sides which are connected on a same long side of the main body portion and are disposed opposite to each other, wherein two recesses are formed between the two oblique sides and the long side of the main body portion respectively.

5. The self-capacitance touch structure according to claim 1, wherein, for each self-capacitance touch electrode,
each of the first side wing portion and the second side wing portion is of a shape of a trapezoid comprising an upper side, a lower side and oblique sides connected between the upper side and the lower side, wherein the upper side is overlapped with a respective long side of the main body portion.

6. The self-capacitance touch structure according to claim 5, wherein, for each self-capacitance touch electrode,
each of the first side wing portion and the second side wing portion is of a shape of an isosceles trapezoid.

7. The self-capacitance touch structure according to claim 5, wherein, for each self-capacitance touch electrode,
a width of the main body portion in a second direction is in a range of 2.5 mm~4.5 mm, and the second direction is perpendicular to the first direction;
a length of the upper side of each trapezoid in the first direction is in a range of 3 mm~5 mm;
a length of the lower side of each trapezoid in the first direction is in a range of 16 mm~22 mm; and
a distance between the upper side and the lower side of each trapezoid in the second direction is in a range of 8 mm~11 mm.

8. The self-capacitance touch structure according to claim 1, further comprising a touch detection chip connected with the plurality of self-capacitance touch electrodes, wherein the touch detection chip is configured to determine a touch position by detecting a change in a capacitance value of each self-capacitance touch electrode.

9. The self-capacitance touch structure according to claim 8, wherein each of the plurality of self-capacitance touch electrodes is connected with the touch detection chip by at least one wire, and the self-capacitance touch electrode and the wire are disposed in different layers.

10. A touch panel, comprising a self-capacitance touch structure, the self-capacitance touch structure comprising a plurality of self-capacitance touch electrodes arranged in an array, each self-capacitance touch electrode comprising a main body portion having a strip shape comprising two opposite long sides extending in a first direction, and a first side wing portion and a second side wing portion symmetrically disposed at the two opposite long sides of the main body portion of the main body portion, wherein
for each self-capacitance touch electrode, a recess is formed between each side wing portion and the main body portion;
the self-capacitance touch electrodes in a same row are spaced from each other, the self-capacitance touch electrodes in two adjacent rows are arranged in a staggered manner, the main body portion of at least one self-capacitance touch electrode in at least one row extends into a gap between two adjacent self-capacitance touch electrodes in another row;
the first side wing portion of at least one self-capacitance touch electrode in at least one row extends into the recess between the second side wing portion and the main body portion of the self-capacitance touch electrode, adjacent to the at least one self-capacitance touch electrode, in another row; and
the second side wing portion of at least one self-capacitance touch electrode in at least one row extends into the recess between the first side wing portion and the main body portion of the self-capacitance touch electrode, adjacent to the at least one self-capacitance touch electrode, in another row.

11. The touch panel according to claim 10, further comprising a first substrate and a second substrate disposed opposite to the first substrate, wherein the self-capacitance touch structure is disposed on the second substrate, and a common electrode layer is disposed on the second substrate, and the plurality of self-capacitance touch electrodes is disposed in a same layer as the common electrode layer.

12. The touch panel according to claim 10, wherein
for each self-capacitance touch electrode, at least two recesses are formed between each side wing portion and the main body portion, and the at least two recesses comprise a first recess and a second recess opposite to the first recess;
the first recess of at least one self-capacitance touch electrode in at least one row is provided therein with a respective side wing portion of another self-capacitance touch electrode positioned at a side of the at least one self-capacitance touch electrode close to the first recess; and
the second recess of at least one self-capacitance touch electrode in at least one row is provided therein with a respective side wing portion of another self-capacitance touch electrode positioned at a side of the at least one self-capacitance touch electrode close to the second recess.

13. The touch panel according to claim 10, wherein, for each self-capacitance touch electrode,
each of the first side wing portion and the second side wing portion comprises an oblique side which is connected onto a respective one of the long sides of the main body portion and is obliquely disposed with respect to the respective long side of the main body portion, wherein the recess between the first side wing portion and the main body is formed between the oblique side of the first side wing portion and one of the long sides of the main body portion, and wherein the recess between the second side wing portion and the main body is formed between the oblique side of the second side wing portion and the other long side of the main body portion.

14. The touch panel according to claim 10, wherein, for each self-capacitance touch electrode,
each of the first side wing portion and the second side wing portion comprises two oblique sides which are connected on a same long side of the main body portion and are disposed opposite to each other, wherein two recesses are formed between the two oblique sides and the long side of the main body portion respectively.

15. The touch panel according to claim 10, wherein, for each self-capacitance touch electrode,
each of the first side wing portion and the second side wing portion is of a shape of a trapezoid comprising an upper side, a lower side and oblique sides connected between the upper side and the lower side, wherein the upper side is overlapped with the long side of the main body portion.

16. The touch panel according to claim 15, wherein, for each self-capacitance touch electrode,
each of the first side wing portion and the second side wing portion is of a shape of an isosceles trapezoid.

17. A display device, comprising a touch screen comprising a self-capacitance touch structure, the self-capacitance touch structure comprising a plurality of self-capacitance touch electrodes arranged in an array, each self-capacitance touch electrode comprising a main body portion having a strip shape comprising two opposite long sides extending in a first direction, and a first side wing portion and a second side wing portion symmetrically disposed at the two opposite long sides of the main body portion, wherein for each self-capacitance touch electrode, a recess is formed between each side wing portion and the main body portion;

the self-capacitance touch electrodes in a same row are spaced from each other, the self-capacitance touch electrodes in two adjacent rows are arranged in a staggered manner, the main body portion of at least one self-capacitance touch electrode in at least one row extends into a gap between two adjacent self-capacitance touch electrodes in another row;

the first side wing portion of at least one self-capacitance touch electrode in at least one row extends into the recess between the second side wing portion and the main body portion of the self-capacitance touch electrode, adjacent to the at least one self-capacitance touch electrode, in another row; and the second side wing portion of at least one self-capacitance touch electrode in at least one row extends into the recess between the first side wing portion and the main body portion of the self-capacitance touch electrode, adjacent to the at least one self-capacitance touch electrode, in another row.

18. The display device according to claim 17, wherein the touch panel further comprises a first substrate and a second substrate disposed opposite to the first substrate, the self-capacitance touch structure is disposed on the second substrate, and a common electrode layer is disposed on the second substrate, and the plurality of self-capacitance touch electrodes is disposed in a same layer as the common electrode layer.

* * * * *